(12) United States Patent
Ianev et al.

(10) Patent No.: US 11,997,640 B2
(45) Date of Patent: May 28, 2024

(54) PAGING FOR DELAY TOLERANT MOBILE TERMINALS AND APPLICATIONS

(71) Applicant: NEC Laboratories Europe GmbH, Heidelberg (DE)

(72) Inventors: Iskren Ianev, Heidelberg (DE); Linghang Fan, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/975,616

(22) Filed: Oct. 28, 2022

(65) Prior Publication Data

US 2023/0051765 A1 Feb. 16, 2023

Related U.S. Application Data

(63) Continuation of application No. 16/970,690, filed as application No. PCT/EP2019/054104 on Feb. 19, 2019, now Pat. No. 11,546,876.

(30) Foreign Application Priority Data

Feb. 19, 2018 (EP) .................................... 18157507

(51) Int. Cl.
- *H04W 68/00* (2009.01)
- *H04M 15/00* (2006.01)
- *H04W 8/08* (2009.01)
- *H04W 48/16* (2009.01)
- *H04W 68/02* (2009.01)

(52) U.S. Cl.
CPC ......... *H04W 68/005* (2013.01); *H04M 15/66* (2013.01); *H04W 8/08* (2013.01); *H04W 48/16* (2013.01); *H04W 68/02* (2013.01)

(58) Field of Classification Search
CPC ..... H04W 68/005; H04W 8/08; H04W 48/16; H04W 68/02
See application file for complete search history.

(56) References Cited

U.S. PATENT DOCUMENTS

| | | | |
|---|---|---|---|
| 10,812,629 B2 * | 10/2020 | Park | H04W 76/15 |
| 11,546,876 B2 * | 1/2023 | Ianev | H04W 8/08 |
| 2012/0202543 A1 | 8/2012 | Murias et al. | |
| 2016/0057730 A1 | 2/2016 | Truelove et al. | |
| 2016/0128078 A1 | 5/2016 | Murthy et al. | |

(Continued)

OTHER PUBLICATIONS

Ericsson, ST-Ericsson, "MTC Device Low power consumption and device triggering," 3GPP draft; S2-101170_S2_78_MTC_DEVICE_TRIGGER, 3rd Generation Partnership Project (3GPP), Mobile Competence Centre; 650, Route des Lucioles; F-06921 Sophia-Antipolis Cedex; France, SA WG2 Meeting #78, San Francisco, USA; 20100222, Feb. 16, 2010, XP050433737.

(Continued)

*Primary Examiner* — Diane D Mizrahi
(74) *Attorney, Agent, or Firm* — Leydig, Voit & Mayer, Ltd.

(57) ABSTRACT

A user equipment (UE) includes a transceiver and a processor. The transceiver is configured to receive, from a network, a paging message including an indication for delayed paging. The indication for delayed paging indicates that the UE is allowed to delay a response to the paging message. The processor is configured to identify the indication for delayed paging in the paging message.

13 Claims, 8 Drawing Sheets

(56) References Cited

U.S. PATENT DOCUMENTS

2016/0309448 A1 10/2016 Truelove et al.
2023/0018140 A1* 1/2023 Catovic ................ H04W 68/00

OTHER PUBLICATIONS

"3rd Generation Partnerhship Project; Technical Specification Group Services and System Aspects; Study on Cellular IoT support and evolution for the 5G System (Release 16)", Technical Report; 3GPP TR 23.724, vol. SA WG2, No. V0.1.0, Feb. 1, 2018, pp. 1-20, XP051392858.

* cited by examiner

PAGING FOR DELAY TOLERANT MOBILE TERMINALS AND APPLICATIONS

CROSS-REFERENCE TO PRIOR APPLICATIONS

This application is a continuation application of U.S. application Ser. No. 16/970,690, filed on Aug. 18, 2020, which is a U.S. National Phase Application under 35 U.S.C. § 371 of International Application No. PCT/EP2019/054104, filed on Feb. 19, 2019, which claims benefit to European Patent Application No. EP 18157507.7, filed on Feb. 19, 2018. The International Application was published in English on Aug. 22, 2019, as WO 2019/158778A1 under PCT Article 21(2). The afore-mentioned applications are all hereby incorporated by reference herein.

FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to paging in the so-called '5G' (or 'Next Generation') systems.

BACKGROUND

3GPP SA2 Working Group has started a study on 5G CIoT in 3GPP Technical Report (TR) 23.724 for Rel-16 with several objectives:
- Enable CIoT/MTC functionalities in 5G CN. The objective is to study how to support identified CIoT/MTC functionalities in 5G CN with potential connectivity to Wideband (WB)-EUTRA (eMTC) and/or NB-IoT for 5GS capable devices.
- Co-existence and migration from EPC based eMTC/NB-IoT to 5GCN. The objective is to study solutions for coexistence and migration from EPC towards 5G CN for eMTC/NB-IoT. It will study solutions where the same service is offered to some UEs connected to EPC and some UEs connected to 5G CN e.g. using SCEF and equivalent functionalities in 5G CN. Solutions that assume that 5G CN needs to support EPC NAS signalling for legacy IoT devices access are not considered.
- 5G System enhancements to address 5G service requirements (based on 3GPP Technical Specification (TS) 22.261 V16.2.0 and TR 38.913 V14.3.0). To study system architecture enhancements to address related service requirements defined in TS 22.261 V16.2.0 and RAN requirements defined in TR 38.913 V14.3.0 and how to enable them in 5G CN, if needed. At least the following service requirements have been identified: Enable the change of association between subscription and address/number of an IoT device within same operator and in between different operators.

3GPP SA2 has already identified multiple Key Issues in order to fulfil the objectives set in the 5G CIoT Study. One of the main areas identified for improvement in the 5G CIoT study is the further improvements in the UE power saving. For example Key Issue 5 of the TR 23.724 V0.1.0 is about UE Transmission (TX) Power Saving Functions. It is observed that when UE communicates with the network, the TX power consumption of each data transmission is more than ten times of the RX power consumption and the TX power consumption contributes much to the UE whole power consumption. So, optimizing the TX power consumption is an effective way to improve UE power saving. This key issue aims to optimize UE TX power consumption under certain conditions, e.g. in weak coverage, with high latency application, or any other conditions under which UE TX power consumption can be improved.

SUMMARY

In an embodiment, the present disclosure provides a user equipment (UE) including a transceiver and a processor. The transceiver is configured to receive, from a network, a paging message including an indication for delayed paging. The indication for delayed paging indicates that the UE is allowed to delay a response to the paging message. The processor is configured to identify the indication for delayed paging in the paging message.

BRIEF DESCRIPTION OF THE DRAWINGS

Aspects of the present disclosure will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

It is observed that when UE communicates with a network, the TX power consumption of each data transmission is more than ten times that of the RX power consumption and the TX power consumption contributes much to the UE whole power consumption.

So, one of the open issues of the 5G CIoT Study in TR23.724 V0.1.0 is to identify the conditions under which UE transmission power consumption can be improved, i.e. reduced. Embodiments described herein provide for saving the UE power consumption for data exchange with the network.

According to one aspect, the present disclosure provides a user equipment (UE) comprising: a transceiver configured to receive, from AMF, a paging message including an indication for delayed paging, wherein the indication for delayed paging indicates that the UE may be allowed to delay a response to the paging message; and a processor configured to identify the indication for delayed paging in the paging message.

The processor may be configured to check whether a received radio signal level is greater than or equal to a predetermined threshold.

The processor may be configured, when the received radio signal level is greater than or equal to a predetermined threshold, the control the UE to respond to the paging request in a normal way.

The processor may be configured, when the received radio signal level is below a predetermined threshold, to control the UE to not respond to the paging request.

The processor may be configured to monitor the received radio signal level.

The processor may be configured, when the received radio signal level becomes greater than or equal to a predetermined threshold, to control the UE to respond to the paging message from AMF.

The processor may be configured, when the received radio signal level stays below a predetermined threshold, to control the UE to not respond to the paging message.

According to one aspect, the disclosure provides an access and mobility management function (AMF) comprising: a processor configured to: generate an indication for delayed paging including an indication for delayed paging into a paging message, wherein the indication for delayed paging indicates that a user equipment (UE) is allowed to delay a response to the paging message; and a transceiver configured to transmit, to the UE, the paging message including the indication for delayed paging.

The processor may be configured to include the delayed paging indicator in the paging message for transmission to the UE when the transceiver receives downlink data with a delayed paging indication from a service provider.

The transceiver may be configured to receive the delayed paging indication with a downlink data request message.

The processor may be configured to include the indication for delayed paging in the paging message for transmission to the UE when the transceiver receives the indication for delayed paging capability from the UE.

The transceiver may be configured to receive the indication for delayed paging capability in a registration request message.

The processor may be configured to include the indication for delayed paging in the paging message for transmission to the UE when a UE subscription information in a Unified Data Management (UDM) reveals the UE or a service is delay tolerant.

The processor may be configured to start a delayed paging timer when the AMF includes the indication for delayed paging in the paging message for transmission to the UE.

When the AMF receives an answer from the UE to a delayed paging request before expiry of the delayed paging timer, the delayed paging may be considered successful.

The transceiver may be configured, when the AMF does not receive an answer for a delayed paging request, from the UE before expiry of the delayed paging timer, to transmit a repeated paging message to the UE and restarts the delay paging timer for predetermined times.

When the AMF receives answer to the repeated paging message before the expiry of the delayed paging timer, the delayed paging may be considered successful.

When the AMF does not receive answer to the repeated paging message before the expiry of the delayed paging timer, the delayed paging may be considered to have failed.

According to one aspect, the disclosure provides a method performed by a user equipment (UE), the method comprising: receiving, from AMF, a paging message including an indication for delayed paging, wherein the indication for delayed paging indicates that the UE is allowed to delay a response to the paging message; and identifying the indication for delayed paging in the paging message.

According to one aspect, the disclosure provides a method performed by an access and mobility management function (AMF), the method comprising: generating an indication for delayed paging including an indication for delayed paging into a paging message, wherein the indication for delayed paging indicates that a user equipment (UE) is allowed to delay a response to the paging message; and transmitting, to the UE, the paging message including the indication for delayed paging.

The present disclosure proposes to introduce a delayed paging feature in the core network and in the UE for delay tolerant services and applications (e.g. mobile devices, applications and services that can tolerate a delay). What is a delayed paging feature:

Delayed paging feature in the core network—An AF can subscribe for delayed paging and the AF can request a delayed paging (e.g. the answer from the mobile terminal can be delayed as the service or application associated with that AF is delay tolerant). The AF may provide a parameter for the allowed max number of delayed paging repetitions by the AMF in case the UE does not answer and also a parameter defining a time interval between the delayed paging repetitions. The AMF pages the UE with a delayed paging indication in the paging message. If the UE does not answer to the first paging attempt (paging cycle), the AMF may repeat the paging with delayed paging indication after the expiry of a delayed paging interval—a parameter which defines the time interval between two delayed paging cycles. The AMF may repeat the delayed paging as many times as set by an associated parameter (e.g. max number of delayed paging parameter). If all attempts for delayed paging are unsuccessful, the AMF falls back to normal paging, i.e. the AMF pages the UE without the indication for delayed paging.

Delayed paging in the UE—when a delayed paging capable UE is paged for delayed paging (e.g. with delayed paging indication in the Paging message), the UE first checks the radio coverage conditions. If the radio coverage conditions are not good (e.g. based on implementation or based on the radio signal quality (e.g. the radio signal quality is below a threshold set and configured in the UE by the operator) or based on any other criteria) the UE may decide not to answer to the delayed paging message, i.e. the paging just fails. In this case the network may repeat the delayed paging after some time (e.g. after the expiry of the delayed paging interval if the max number of the delayed paging repetitions are not exhausted).

If the radio coverage conditions are considered to be good (again based on the above listed criteria), the UE answers to the delayed paging.

Examples described herein are particularly beneficial when the applications or services the UE is paged for are delay tolerant (e.g. are not delay sensitive and can wait for the terminal to answer) and the paged UE or mobile device is mobile (e.g. the UE is mobile which suggest a change in the radio coverage conditions or even when the UE is not mobile but there are fluctuations in the signal strength and quality). The delayed paging feature described herein allows the UE to answer to the delayed paging when the radio coverage conditions are good and thus it saves UE power without decreasing the quality of the service.

If none of the delayed paging attempts by the network are successful (i.e. the UE does not answer to any of the attempts for delayed paging as the radio coverage conditions has stayed bad, the AMF falls back to normal paging which the UE now must answer regardless of the radio coverage conditions.

Figure 1:
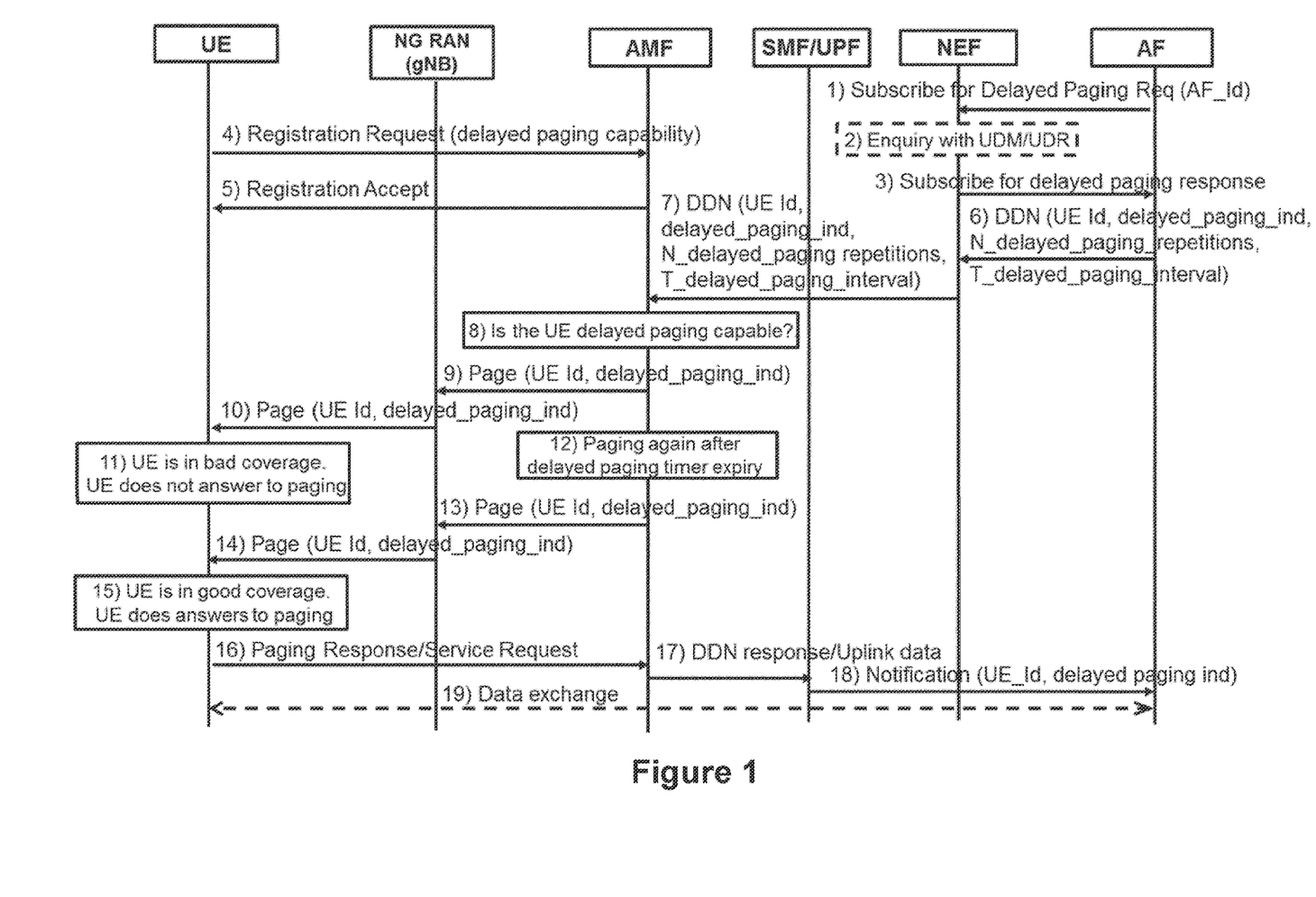
FIG. 1 is a schematic signalling (timing) diagram illustrating an exemplary procedure for delayed paging for mobile terminals (UEs)

FIG. 1 is a schematic signalling (timing) diagram illustrating an exemplary procedure for delayed paging for mobile terminals (UEs).

1) An AF requests the NEF for delayed paging subscription and authorization by invoking Subscribe for Delayed Paging Request (AF Id) message (e.g. Nnef EventExposure Subscribe Request message or any other suitable service request for the purpose of obtaining a subscription and an authorisation for the use of delayed paging feature).
2) The NEF may make an enquiry with the UDM/UDR and/or PCF and or SMF/UPF and/or AMF before confirming and authorizing the AF for the subscription and for the use of delayed paging feature.
3) The NEF answers with Subscribe for Delayed Paging Confirmation message (e.g. Nnef EventExposure Subscribe Confirmation message or any other suitable message for the purpose of confirming and authorizing the AF for the delayed paging feature).
4) A UE capable of delayed paging feature indicates its capability for it to the network (e.g. AMF) at registration by including a delayed paging capability indication (or any other notion of indication with the purpose to indicate that the UE is capable to handle paging for delay tolerant services and applications (e.g. services and applications that are not delay sensitive) e.g. Registration Request (delayed paging) message or in any other NAS or AS signaling with an indication for delayed paging capability in the UE. The UE capability for delayed paging may be indicated from the UE to the network within the UE network capability information and/or within the UE radio capability information.

The UE delayed capability information may be indicated by the UE to the network also in other NAS messages like Service Request and PDU Session Establishment Request messages or TAU Request and RAU Request in case of 4G and 3G mobile network. In another example the UE delayed paging capability could be indicated to the RAN Node (e.g. gNB in 5G or eNB in 4G) within one of the RRC signaling messages from the UE. Yet in another example the UE delayed paging capability could be relayed to the AMF/MME from the RAN Node or vice versa, from the RAN Node (e.g. gNB or eNB) to the MME within a suitable N2 (or S1) signaling message.
5) The network (e.g. AMF) accepts the UE registration with the network.
6) When the AF wants to exchange non-delay sensitive data (i.e. delay tolerant data or service) with a UE, the AF invokes Downlink Data Notification (e.g. DDN (UE Id, delayed_paging_ind, N_delayed_paging_repetitions and T_delayed_paging_interval) or any other suitable message or service request for the purpose of downlink data notification with delayed paging. The delayed_paging_ind parameter (or any other notion for the same purpose) is included when the AF request is for delayed paging. The N_delayed_paging_repetitions parameter (or any other notion for the same purpose) defines (if included) the maximum number for delayed paging repetitions (i.e. how many times the delayed paging can be exercised by the AMF if the UE did not respond). The delayed paging repetition is different from the normal paging repetition where the AMF repeats several time the paging in a very short time. The delayed paging repetitions is defined by a designated time parameter called for example T_delayed_paging_interval. The T_delayed_paging_interval (or any other notion for the same purpose) defines the time interval after which the delayed paging can be repeated by the AMF.
7) The NEF verifies that the AF is subscribed and authorized for 'delayed paging' and forwards (e.g. via the UPF and/or SMF nodes that are involved in the setting of the likely data link) the downlink data notification towards AMF.
8) AMF checks if the UE to be paged is capable of delayed paging. The UE may have the information about the UE delayed paging capability in the UE context within the AMF or the AMF may enquire the UDM/UDR for that. The AMF may also check with the PCF (hPCF or vPCF) for any restrictions on the use of delayed paging feature for the UE being paged or in general (or UE s in general based on location and/or time).
9) If the UE is capable of delayed paging, the AMF invokes Paging Request to the gNB and includes a delayed paging indication in it (or any other notion for indication for the purpose of delayed paging), e.g. Paging Request (UE_Id, delayed_paging_ind or any other message to the gNB with the purpose of paging the UE with the delayed paging feature). Then the AMF starts the timer for delayed paging (if included), e.g. T_delayed_paging_interval.
10) The gNB pages the UE by including the delayed paging indication (or any other notion for indication of delayed paging) in the Page Request message, e.g. paging Request (UE_Id, delayed_paging_ind) or any other message for the purpose of paging the UE with delayed paging feature.
11) When the UE reads the paging message and finds out it is a delayed paging, the UE checks whether the radio coverage conditions are good. If not, the UE does not responds to the paging.
12) At expiry of the delayed paging timer T_delayed_paging_interval timer in the AMF, if the AMF has not received response from the UE to the paging and the N_delayed_paging_repetitions counter has not reset (i.e. is not zero yet), the AMF repeats the delayed paging again, re-starts the delayed paging timer T-delayed_paging_interval and decreases with one the max number of delayed paging repetitions—N_delayed_paging_repetitions counter.
13) The AMF invokes another Paging Request message to the AMF with delayed paging indication in it.
14) The gNB in turn pages the UE with delayed paging indication in the paging message-Paging Request (UE_Id, delayed_paging_ind).
15) When the UE reads the paging message and finds out it is a delayed paging, the UE checks whether the radio coverage conditions are good. If yes, the UE responds to the paging message.
16) The UE answers the delayed paging with Paging Response (or any other message for the purpose of answering to paging like Service Request or PDU session establishment, etc.).

17) At receiving the Paging Response/Service Request or PDU session establishment from the UE the AMF resets the delayed paging timer and the N delayed paging repetitions counter and invokes DDN response or Uplink data message to the SMF/UPF or NEF as an answer to the delayed paging from the AF.

18) The SMF/UPF notifies the AF with the UE response (PDU session or Service Request) to delayed paging.

19) A data exchange (DL and/or UL) takes place.

Figure 2:
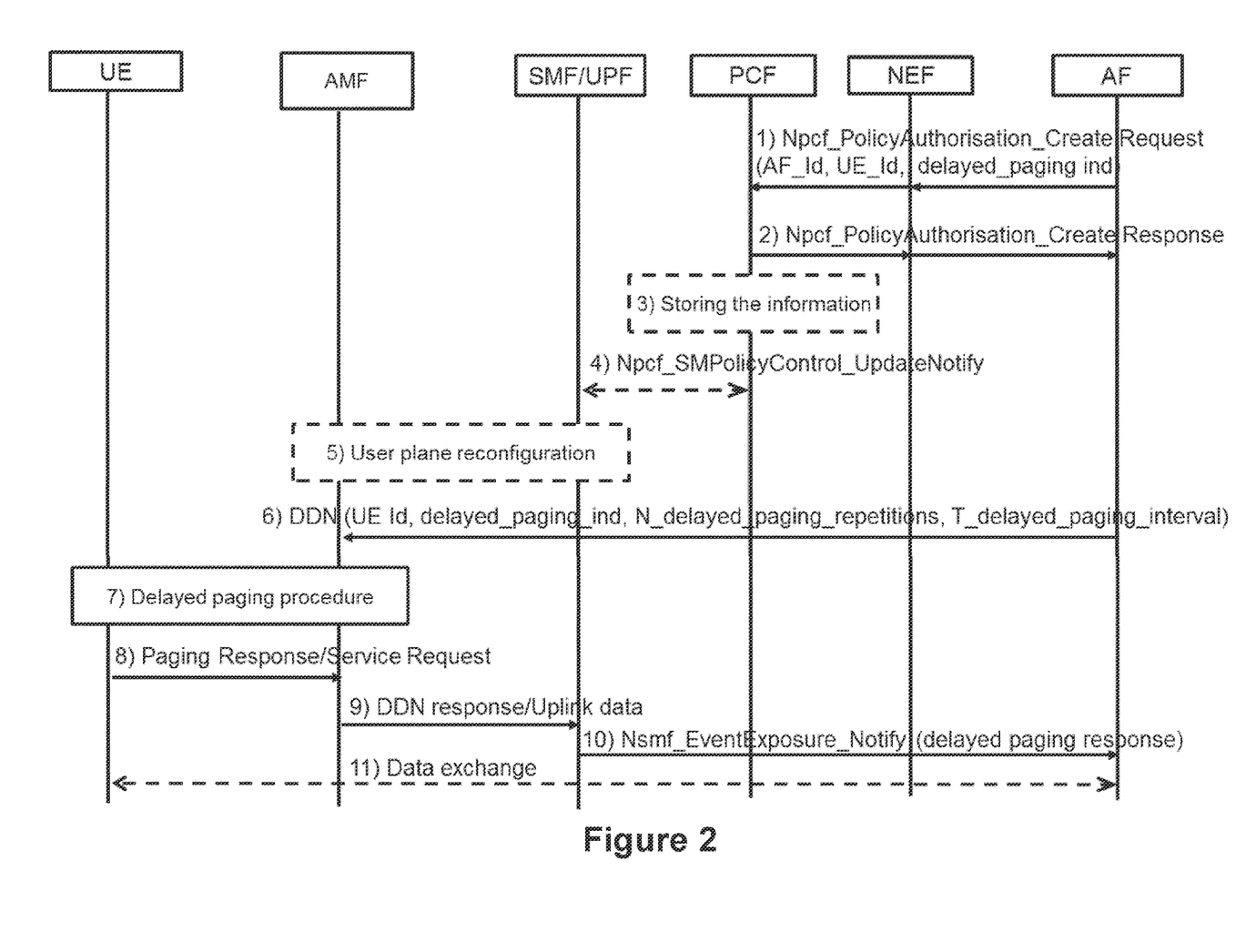
FIG. 2 is a schematic signalling (timing) diagram illustrating an exemplary procedure for AF subscription for delayed paging response notification.

FIG. 2 is a schematic signalling (timing) diagram illustrating an exemplary procedure for AF subscription for delayed paging response notification.

1) The AF invokes an Npcf_PolicyAuthorization_Create Request service operation to the PCF directly or via the NEF to request a subscription to notifications about delayed paging response event. The request contains parameters as AF Id, and delayed paging indication parameter.

2) The PCF invokes Npcf_PolicyAuthorization_Create Response service operation.

3) The PCF may store the AF request for usage by future PDU Sessions related to delayed paging from the same AF.

4) The PCF may update the SMF with corresponding new PCC rule(s) related to the delayed paging by invoking Npcf_SMPolicyControl_UpdateNotify service operation.

5) When a PCC rule is received from the PCF, the SMF may take appropriate actions to reconfigure the User plane of the PDU Session such as Subscribe to notifications from the AMF for an area of interest like UE response from delayed paging via Namf_EventExposure_Subscribe service operation.

6) When the AF wants to exchange non-delay sensitive data (i.e. delay tolerant data or service) with a UE, the AF invokes Downlink Data Notification (e.g. DDN (UE_Id, delayed_paging_ind, N_delayed_paging_repetitions and T_delayed_paging_interval) or any other suitable message or service request for the purpose of downlink data notification with delayed paging.

7) The AMF invokes the delayed paging procedure with the UE as described with reference to FIG. 1 above.

8) The UE answers the delayed paging with Paging Response (or any other message for the purpose of answering to paging like Service Request or PDU session establishment, etc.).

9) The SMF/UPF notifies the intended AF the Paging Response (e.g. PDU session or Service Request) related to the UE response to the delayed paging by invoking Nsmf_EventExposure_Notify service operation with included delayed paging indication in it.

Figure 3:
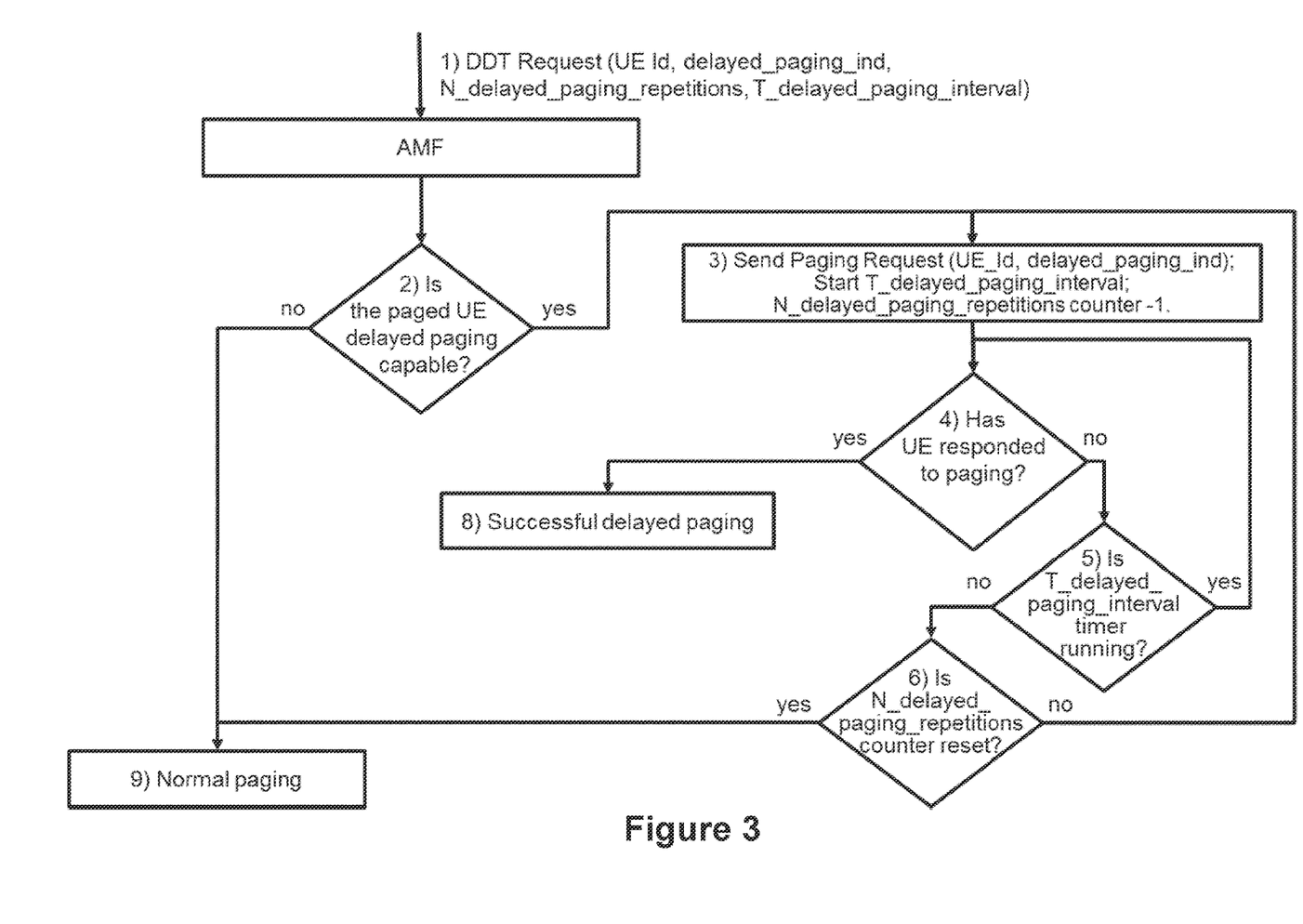
FIG. 3 is a schematic flow chart illustrating an exemplary procedure at the AMF when receiving a request for delayed paging by the AF via NEF and possible SMF/UPF.

FIG. 3 is a schematic flow chart illustrating an exemplary procedure at the AMF when receiving a request for delayed paging by the AF via NEF and possible SMF/UPF.

1) AMF receives a request for delayed paging—e.g. DDN (UE_Id, delayed paging indication, N_delayed_paging_repetitions, T_delayed_paging_interval) or any other suitable message for the purpose of paging the UE with indication in it for use of the delayed paging feature and parameters to assist the delayed paging feature in the AMF like time interval between the delayed paging attempts and the max number for the delayed paging attempts.

2) AMF checks if the UE to be paged for delayed paging is delayed paging capable UE. The UE capability information for delayed paging may be available in the UE context. If not the AMF may enquire the UDM/UDR. The AMF may also check with the PCF (hPCF or vPCF) for any restrictions on the use of delayed paging feature for the UE being paged or in general (or UE s in general based on location and/or time).

3) If the UE is delayed paging capable UE, the AMF:
Invokes Paging Request message to the UE (via gNBs) with included indication for delayed paging;
If a parameter for maximum delayed paging is available (e.g. N_delayed_paging_count) and it is not zero, the UE starts a delayed paging timer (e.g. T_delayed_paging_timer);
Decreases the max number of delayed paging parameter (e.g. N-delayed_paging_count) by 1 if it is not yet zero.

4-5) The AMF is waiting for the Paging Response while the delayed paging timer is running.

6) If the UE does not respond until the delayed paging timer expires, the AMF checks whether further repeat of delayed paging is allowed (based on e.g. N-delayed_paging_count).
If the delayed paging repetitions counter is not zero yet, the AMF starts from step 3 by sending another paging request with delayed paging indication.
If the delayed paging repetitions counter is zero, the delayed paging ends with failure. In this case the AMF has exhausted all the attempts for delayed paging with no success (e.g. meaning the UE was not in good radio coverage during the delayed paging attempts). Then the AMF falls back to normal paging at step 8 and pages the UE for normal paging (i.e. without an indication for delayed paging) to which the UE now must answer regardless of the radio coverage conditions.

7) If at step 5 the UE responds to the delayed paging request before the expiry of the delayed paging timer, the UE paging finishes successfully.

8) If at step 2 the AMF finds out that the paging request does not include indication for delayed paging (i.e. it is not delayed paging) the AMF executes normal paging.

Figure 4:
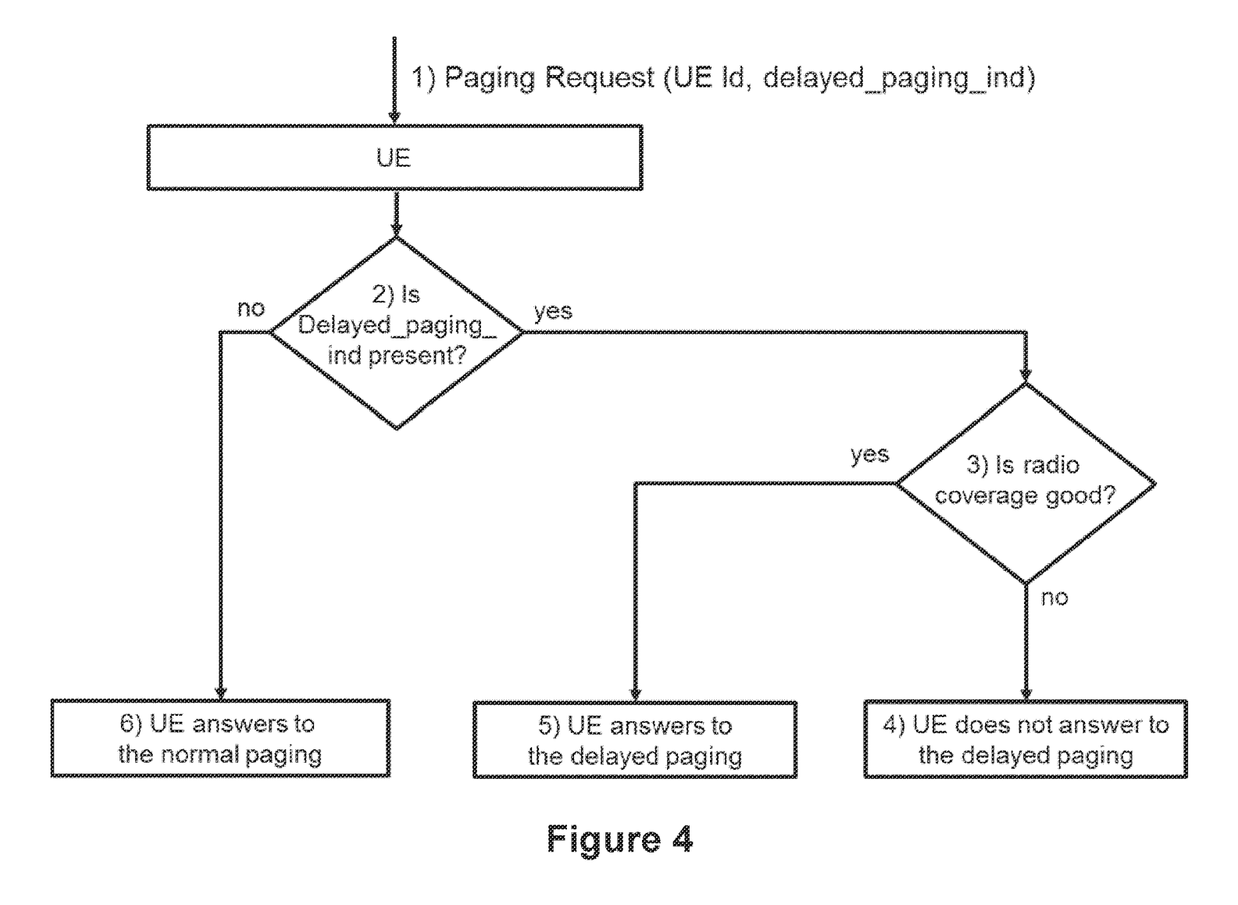
FIG. 4 is a schematic flow chart illustrating an exemplary procedure at the UE when receiving a request for delayed paging.

FIG. 4 is a schematic flow chart illustrating an exemplary procedure at the UE when receiving a request for delayed paging.

1) UE receives a paging with delayed paging indication in the paging message (or any other notion for indication for delayed paging or paging for delay tolerant services or applications).

2) The UE checks if the paging is normal paging or delayed paging.

3) If the paging is for delayed paging (e.g. with an appropriate indication for delayed paging present within the Paging message), the UE checks the radio coverage conditions.

4) If the radio coverage conditions are not good (e.g. based on implementation or based on the radio signal quality (e.g. the radio signal quality is below a threshold set and configured in the UE by the operator for example via OMA DM or via NA/AS signalling) or based on any other criteria in the UE) the UE may decide not to answer to the paging message, i.e. the paging just fails. In this case the network may repeat the delayed paging after the expiry of the delayed paging interval if the maximum number of the delayed paging repetitions are not exhausted yet.

5) If the radio coverage conditions are good (e.g. based on implementation or based on the radio signal quality (e.g. the radio signal quality is greater than or equal a threshold set and configured in the UE by the operator) or based on any other criteria in the UE), the UE answers the paging message for delayed paging.

6) If at step 2 the UE finds out the paging is a normal paging (i.e. no indication for delayed paging in the Paging message) the UE answers the paging regardless of the radio coverage conditions.

Summary

Beneficially, the above described exemplary embodiments include, although they are not limited to, one or more of the following functionalities:

1) AF subscription for delayed paging;
2) AF authorisation for delayed paging;
3) delayed paging capability parameter in the Registration request message;
4) New parameters in the downlink data indication message from the AF to NEF to SMF/UPF to the AMF, the parameters includes at least one:
   delayed paging indication parameter—e.g. delayed_paging_ind;
   delayed paging interval parameter—e.g. T_delayed_paging_interval;
   number of delayed paging repetitions parameter—e.g. N_delayed_paging_repetitions;
5) delayed paging feature logic in the AMF;
6) delayed paging indication in the Paging message from AMF to gNB;
7) delayed paging indication in the Paging message from the gNB to the UE;
8) delayed paging feature logic in the UE.

It can be seen that the above embodiments describe various exemplary procedures in which:

1) AF (e.g. service provider) registering with the 5G network for use of delayed paging feature/service.
2) A mobile terminal (e.g. UE) that is delayed paging capable indicates its capability for delayed paging at registration (e.g. includes a delayed paging capability indication in the Registration Request message).
3) When AMF receives a request from an AF for delayed paging (with included indication for delayed paging, max number of delayed paging repetitions and the time interval between delayed paging repetition), the AMF applies the logic for delayed paging as described with reference to FIG. 3.
4) When a UE is paged for delayed paging (a paging with indication for delayed paging), the UE applies the logic for delayed paging as described with reference to FIG. 4.
5) When AMF exhausts all the allowed attempts for delayed paging and there is still no response from the UE (e.g. the UE has not answered the paging as the UE considered the radio coverage as not good enough), the AMF falls back to normal paging where the UE must respond regardless of the radio coverage conditions.

It can be seen that the above embodiments beneficially provide a number of benefits, including (but not limited to) reducing UE power consumption in low coverage conditions by delaying a response to paging signalling (at least for those services and applications that are delay tolerant) until coverage conditions improve.

System Overview

Figure 5:
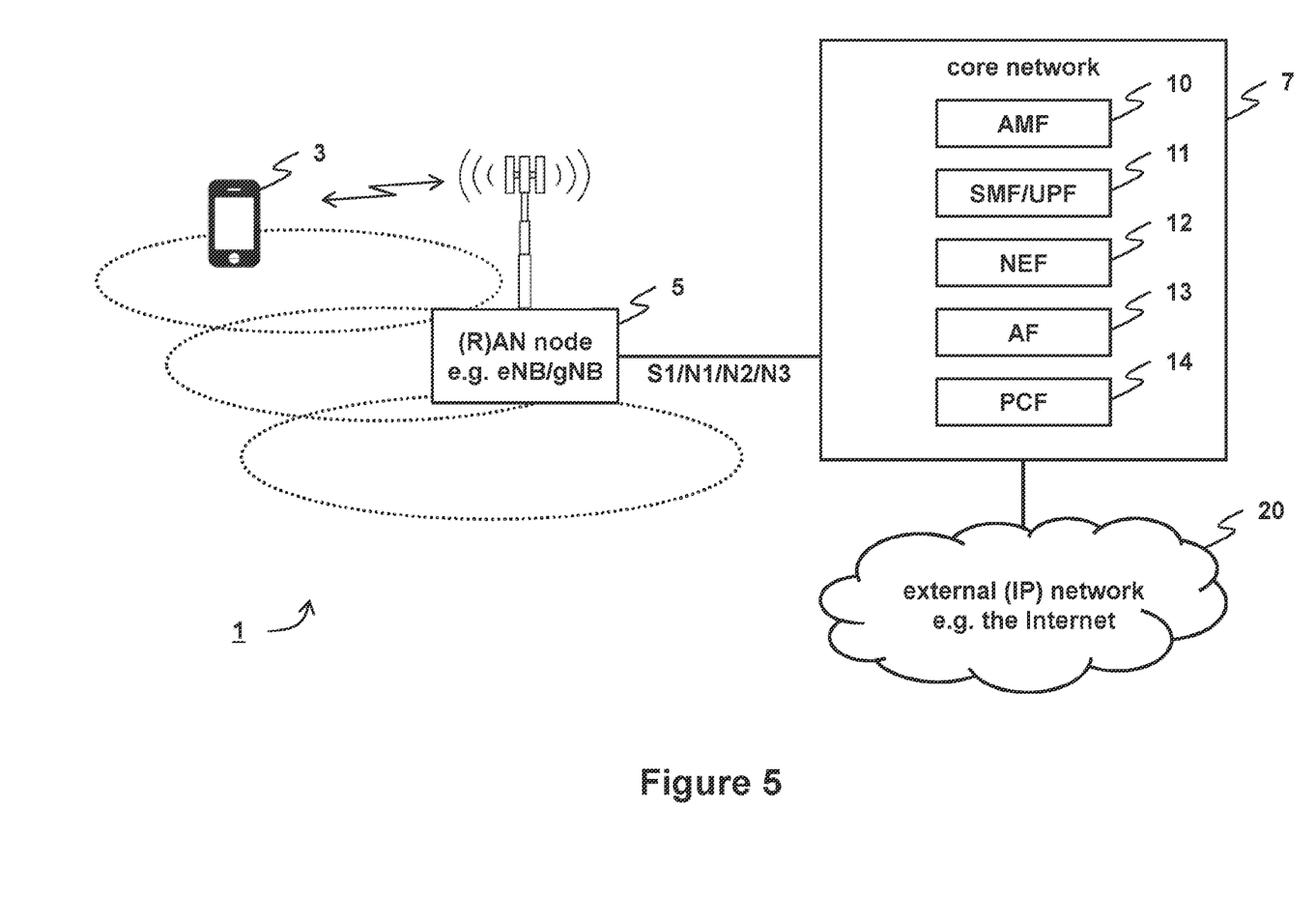
FIG. 5 schematically illustrates a mobile (cellular or wireless) telecommunication system 1 to which the described embodiments are applicable.

FIG. 5 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 5 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

In this example, the core network 7 includes, amongst others, an Access and Mobility Management Function (AMF) 10, a Session Management Function (SMF)/User Plane Function (UPF) 11, a Network Exposure Function (NEF) 12, an Application Function (AF) 13, and a Policy Control Function (PCF) 14.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like). From the core network 7, connection to an external IP network 20 (such as the Internet) is also provided.

The components of this system are beneficially configured to perform the above described delayed paging functionality (at least for those services and applications that are delay tolerant).

User Equipment (UE)

Figure 6:
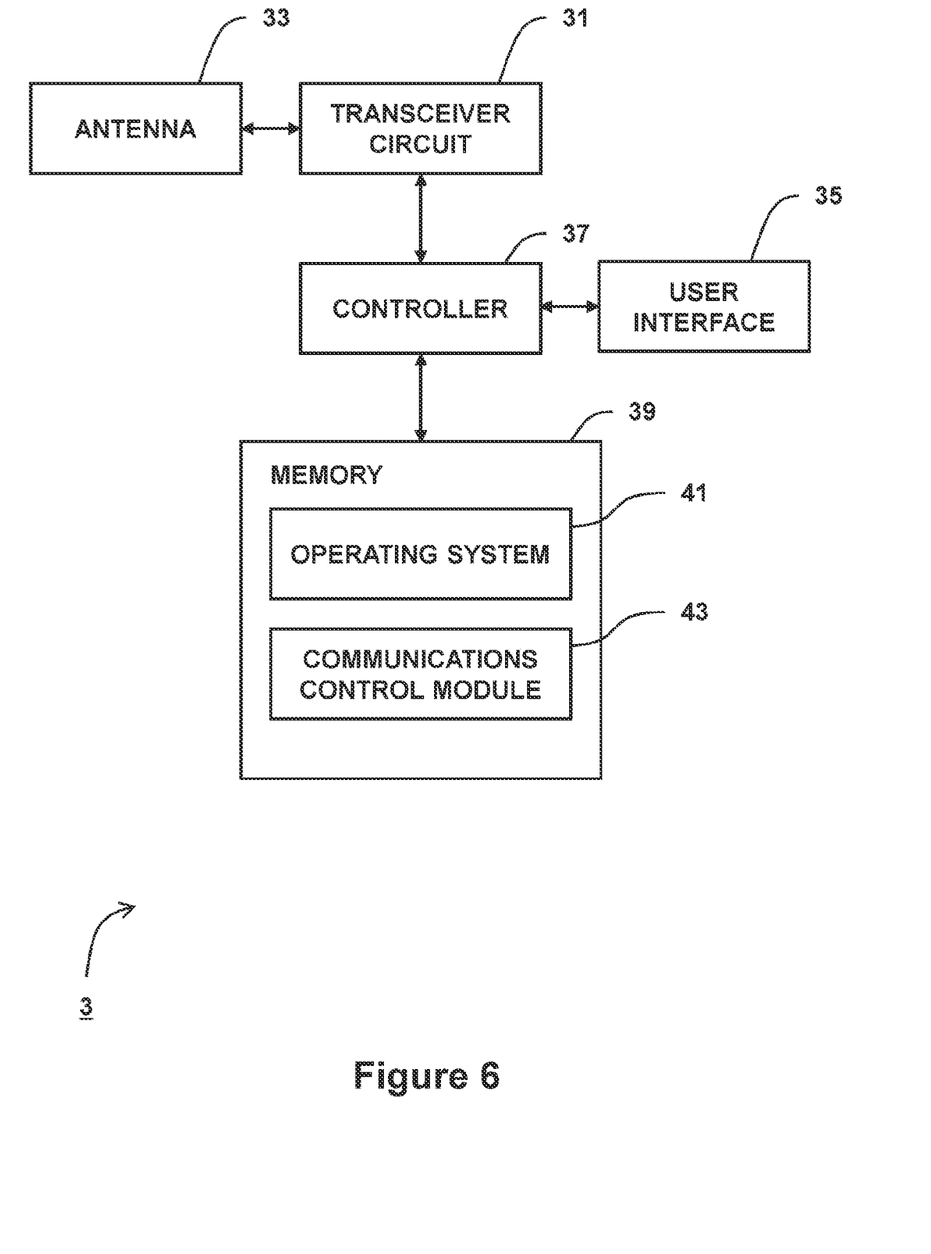
FIG. 6 is a block diagram illustrating the main components of the UE shown in FIG. 5.

FIG. 6 is a block diagram illustrating the main components of the UE (mobile device 3) shown in FIG. 5. As shown, the UE includes a transceiver circuit 31 which is operable to transmit signals to and to receive signals from the connected node(s) via one or more antenna 33. Although not necessarily shown in FIG. 6, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes. Such signalling also includes paging messages and communication relating to delayed paging.

(R)AN Node

Figure 7:
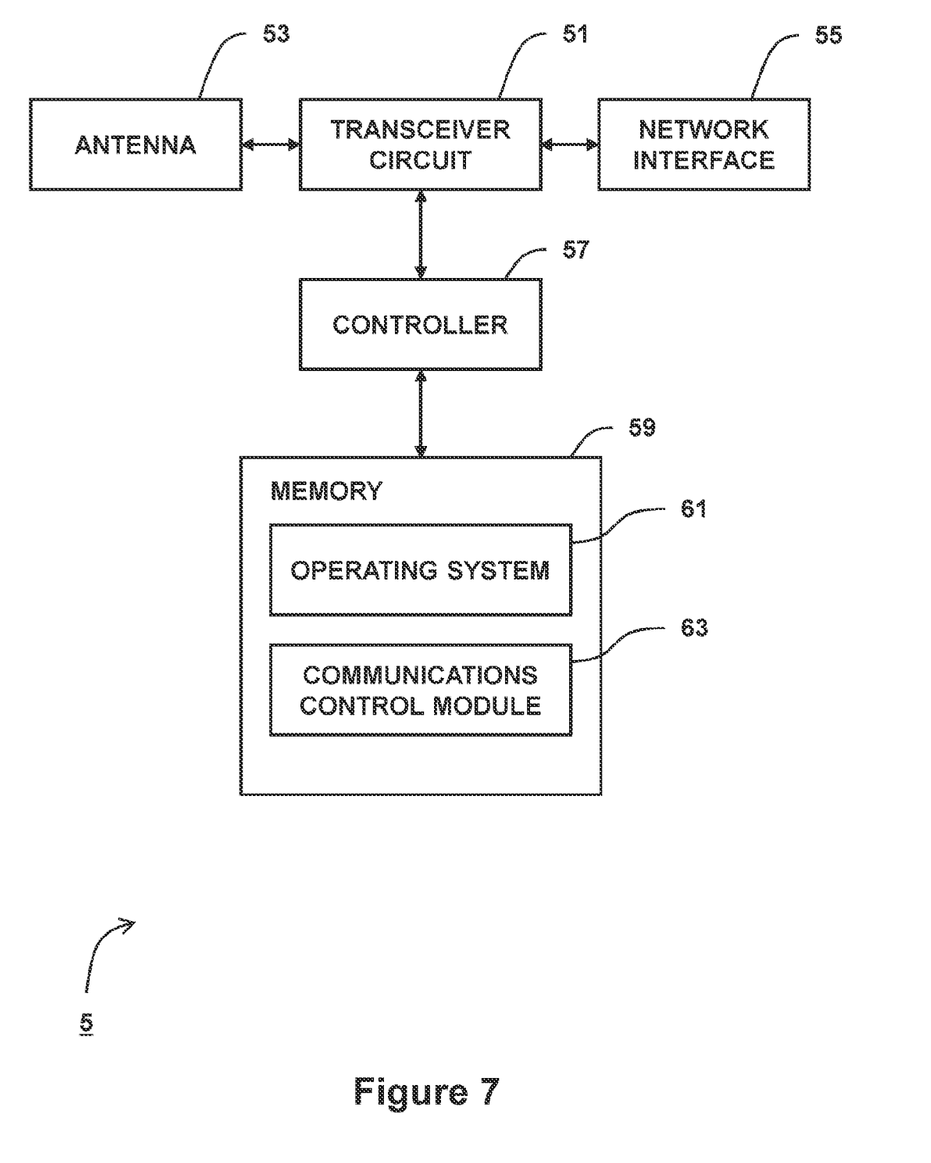
FIG. 7 is a block diagram illustrating the main components of an exemplary (R)AN node shown in FIG. 5.

FIG. 7 is a block diagram illustrating the main components of an exemplary (R)AN node 5 (base station) shown in FIG. 5. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes. Such signalling also includes paging messages and communication relating to delayed paging of delay tolerant UEs/applications.

Core Network Node

Figure 8:
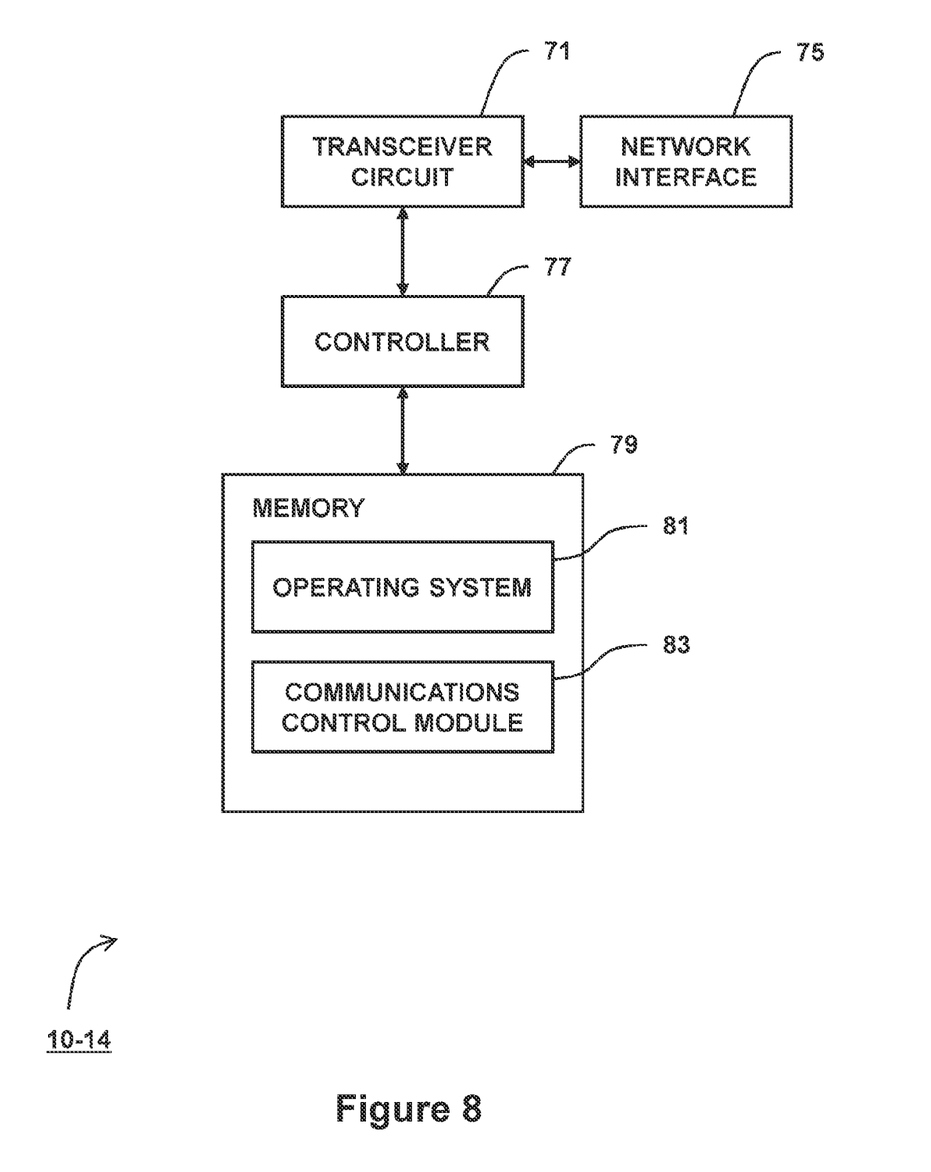
FIG. 8 is a block diagram illustrating the main components of a generic core network node shown in FIG. 5.

FIG. 8 is a block diagram illustrating the main components of a generic core network node shown in FIG. 5 (e.g. AMF 10, SMF/UPF 11, NEF 12, AF 13, and/or PCF 14). As shown, the core network node includes a transceiver circuit 71 which is operable to transmit signals to and to receive signals from other nodes (including the UE 3, the (R)AN node 5, and other core network nodes) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and a communications control module 83. The communications control module 83 is responsible for handling (generating/sending/receiving) signaling between the core network node and other nodes, such as the UE 3, (R)AN node 5, and other core network nodes. It will be appreciated that, depending on its configuration, the core network node may have additional modules, for example, a paging module and/or the like.

MODIFICATIONS AND ALTERNATIVES

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

The above exemplary embodiments have been described in the context of a 5G network. However, it will be appreciated that the above described delayed paging feature and functionality may also be applicable for 4G and 3G mobile networks and technologies. In this case the involved network nodes are MME in 4G or SGSN in 3G for AMF in 5G, S-GW and P-GW in 3G and 4G for SMF/UPF in 5G, MTC-IWF in 3G and SCEF in 4G for NEF in 5G, HSS in 3G and 4G for UDM/UDR in 5G, AS in 3G and 4G for AF in 5G, RNC in 3G and eNB in 4G for gNB in 5G, Attach Request, RAU Request and TAU Request in 3G and 4G for Registration Request in 5G.

In the above description, the UE, the (R)AN node, and the core network node are described for ease of understanding as having a number of discrete modules (such as the communication control modules). Whilst these modules may be provided in this way for certain applications, for example where an existing system has been modified to implement any aspect of the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

Various other modifications will be apparent to those skilled in the art and will not be described in further detail here.

While embodiments of the have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES

[1] TS 23.502 V15.0.0
[2] TS 23.682 V15.3.0
[3] TR23.724 V0.1.0

ABBREVIATIONS AND TERMINOLOGY

3GPP 3rd Generation Partnership Project
5G-RAN 5G Radio Access Network
5GS 5G System
AF Application Function
AMF Access and Mobility Management Function
AS Access Stratum
CIoT Cellular Internet of Things
CN Core Network
DL Down Link
E-UTRA Evolved UMTS Terrestrial Radio Access
EPC Evolved Packet Core
EPS Evolved Packet System
HLR Home Location Register
HPCF Home PLMN Policy Control Function
HSS Home Subscriber Server
eMTC enhanced Machine Type Communication
eNB enhanced NodeB
gNB next Generation NodeB
MME Mobility management Entity
MTC Machine Type Communication
NB-IoT Narrow Band Internet of Things
NAS Non Access Stratum
NF Network Function
NEF Network Exposure Function
NR New Radio
SGSN Serving GPRS Support Node
PCF Policy Control Function
RAN Radio Access Network
RAU Routing Area Update
RNC Radio Network Controller
RRC Radio Resource Control
SCEF Service Capability Exposure
SIB System Information Block
SMF Session Management Function
TAU Tracking Area Update
VPCF Visiting PLMN Policy Control Function
UDM Unified Data Management
UDR Unified Data Repository
UPF User Plane Function
UE User Equipment
UL Up Link

What is claimed is:

1. A method for a user equipment (UE), the method comprising:
transmitting capability information of delayed paging to a network;
receiving at least one delayed paging message including an indication indicating that the UE is allowed to delay a response to one of the at least one delayed paging message, based on the capability information; and
determining to transmit a response to the one of the at least one delayed paging message with delay based on the indication.

2. The method according to claim 1, wherein
the receiving the at least one delayed paging message is performed based on a restriction from a policy control function.

3. The method according to claim 1, wherein
the receiving the at least one delayed paging message is performed based on a location of the UE or a time.

4. The method according to claim 1, wherein
the at least one delayed paging message includes information of a repetition number for the delayed paging and information of a time interval for the delayed paging.

5. The method according to claim 1, wherein
the capability information is transmitted in a non access stratum (NAS) message or a radio resource control (RRC) message.

6. The method according to claim 1, further comprising:
checking whether a radio coverage condition is good for responding in a case where the at least one delayed paging message includes the indication, and wherein
the determining to transmit the response is performed in a case where checking that the radio coverage condition is good for responding.

7. A method for a core network node, the method comprising:
receiving capability information of delayed paging from a user equipment (UE);
transmitting at least one delayed paging message including an indication indicating that the UE is allowed to delay a response to one of the at least one delayed paging message to the UE, based on the capability information; and
receiving a response to the one of the at least one delayed paging message with delay based on the indication.

8. The method according to claim 7, wherein
the transmitting the at least one delayed paging message is performed based on a restriction from a policy control function.

9. The method according to claim 7, wherein
the transmitting the at least one delayed paging message is performed based on a location of the UE or a time.

10. The method according to claim 7, wherein
the transmitting the at least one delayed paging message is performed based on information of a repetition number for delayed paging and information of a time interval for delayed paging.

11. The method according to claim 7, wherein
the capability information is transmitted in a non access stratum (NAS) message or a radio resource control (RRC) message.

12. A user equipment (UE) comprising:
a memory storing instructions; and
at least one processor configured to process the instructions to:
transmit capability information of delayed paging to a network;
receive at least one delayed paging message including an indication indicating that the UE is allowed to delay a response to one of the at least one delayed paging message from the network, based on the capability information; and
determine to transmit a response to the one of the at least one delayed paging message with delay based on the indication.

13. A core network node comprising:
a memory storing instructions; and
at least one processor configured to process the instructions to:
- receive capability information of delayed paging from a user equipment (UE);
- transmit at least one delayed paging message including an indication indicating that the UE is allowed to delay a response to one of the at least one delayed paging message to the UE, based on the capability information; and
- receive a response to one of the at least one delayed paging message with delay based on the indication.

* * * * *